July 4, 1967  O. C. ELBERT  3,328,915
SUPPORT RACK FOR TOMATOES AND PEAS
Filed April 21, 1965
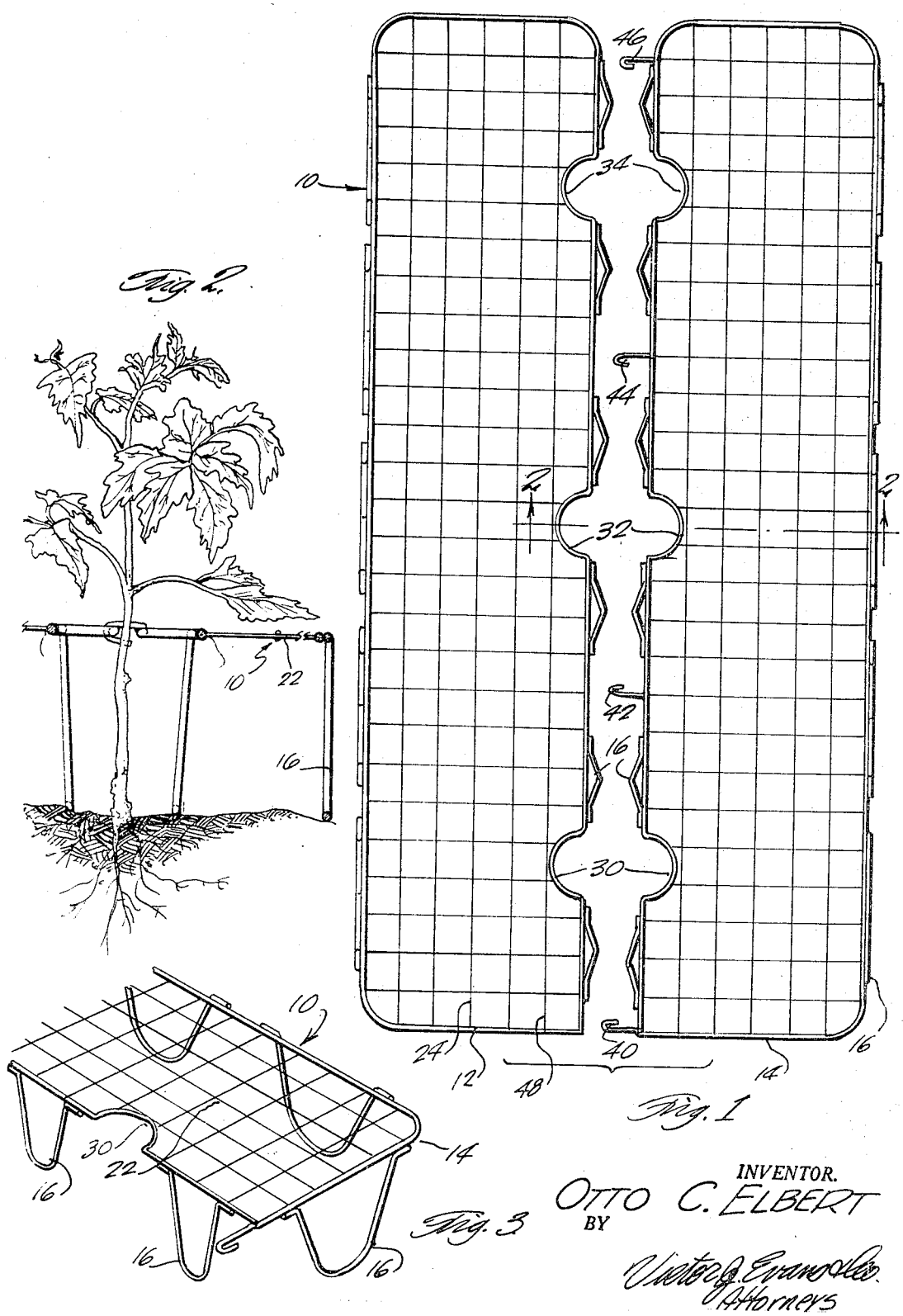
INVENTOR.
OTTO C. ELBERT
BY
ATTORNEYS

United States Patent Office 3,328,915
Patented July 4, 1967

3,328,915
SUPPORT RACK FOR TOMATOES AND PEAS
Otto C. Elbert, Box 35, Whittemore, Iowa 50598
Filed Apr. 21, 1965, Ser. No. 449,845
1 Claim. (Cl. 47—44)

The present invention relates to an improved tomato and pea support rack for holding in an elevated position from the ground the tomatoes and peas and other vines or plant stems by the mating type of support rack of the present invention, and more particularly the invention relates to an improved support rack which will also prevent the fruit from a plant from touching the ground and rotting, while at the same time will provide for sections of the device which are joined together to partially encircle the trunks of each of a multiplicity of plants so that when the sections are inspected, the fruit of the vine supported by the rack may be readily removed and replaced for cultivation, fertilization, etc.

More particularly, the invention provides as an object thereof a support rack having recesses for receiving plants so that the racks are placed under the plants accordingly, until the plants are fully grown. The object, therefore, is to provide noninterfering cooperation of the plants while being cultivated, and so that the racks may be placed early in the growth of the plants to support the fruit or vegetables from damage during wind storms and other forces that may cause the plants to break and the fruit to fall to the ground.

A further object of the invention is to provide racks and support members which will keep tomatoes and peas from resting upon the ground and prevent them from rotting while resting upon the ground.

Another object of the invention is to provide a support means to allow the vines of the plants to spread out so that an increased amount of sun and rain will affect the growth of the plants.

The above and other objects and advantages of the invention will become apparent upon full consideration of the following detailed description and accompanying drawings in which:

FIGURE 1 is a plan view of the improved support rack for tomatoes and peas according to the present invention;

FIGURE 2 is a side elevational view taken along lines 2—2 of FIGURE 1, and also showing the manner in which a plant such as peas may be disposed within the apertures of the support rack for supporting the plant upon its becoming loaded with fruit; and FIGURE 3 shows a perspective view of a portion of the rack and the manner in which it is adapted to be connected to the mating support rack, as well as the manner in which it is supported from the ground.

Referring now to the drawings, there is shown the improved fruit or vegetable support rack 10 comprising a mating or intercoupling pair of sections 12, 14, and each being provided with support loops 16, 16, that are spatially disposed about the periphery of the support frames 12, 14.

The support frames 12, 14 are disposed with a support layer or supporting surface 22 constructed of a mesh 24 of wires that are connected from the peripheral portions of the support members 12, 14, and are transversely disposed with the wires in a perpendicularly oriented direction. Thus the matrix comprises a type of screen with large holes or openings therein but sufficiently small to retain the boughs, pea pods or tomatoes that may be caused to be supported from the surface 24.

The supporting frames 12, 14 are about 5–8 inches from the ground, and are generally 5–6 inches from the ground so that the stalk portion of the plant is sufficiently protected, and the fruit is conveniently adapted to be supported and laid out upon the supporting surface of the support rack 10.

In order to advantageously use the support racks of the invention, the racks are disposed with a plurality of plant receiving portions forming apertures 30, 32, 34, that are intermediately disposed between the frame members 12, 14, as shown in FIGURE 1, so that the plant may be disposed to be positioned in the apertures 30, 32, 34, without impeding the motion of the plant as it moves about in the wind or is caused to grow.

The frame members 12, 14 are adapted to hook together by means of hook members 40, 42, 46, the hook of the member engaging one of the wires forming the mesh of the matrix 24, such as wire 48 as shown in FIGURE 1.

In using the support frames, it is not necessary that they be placed about the growing plants until the stage of growth is that of fully grown. The racks, therefore, do not interfere with cultivation in the early stages of growth, and when the fully grown stage is reached, the racks are placed about the plant so that the pea pods or tomatoes being protected is capable of being displaced about and upon the support frames to keep the upper portions of the plants from coming into contact and resting upon the ground, and thus prevent rotting or other deterioration. The support racks are assembled about a series or plurality of plants which have been planted in a series relation that is symmetrically and cooperatively disposed with the apertures for receiving the plants. Thus the apertures 30, 32, 34 are adapted to receive the plants, the plants having been previously planted a distance apart corresponding essentially to the spacing of the openings 30, 32, 34.

The construction of the support racks is such that they may be comprised of wire elements and may be soldered together to the frame forming the periphery of the support racks, and thus are simple and expedient for construction, repair, and adjustment. Although wire is shown and is recommended for use in forming the support surface of the support members 12, 14, it is within the contemplation of the present invention that a plastic sheet, whether perforated or not, could be used in forming and constructing a lightweight, waterproof when not perforated, assembly for correspondingly achieving the same objects and advantages as the wire construction above described.

Additional embodiments of the invention in this specification will occur to others and therefore it is intended that the scope of the invention be limited only by the appended claims and not by the embodiment described hereinabove. Accordingly, reference should be made to the following claim in determining the full scope of the invention.

What is claimed is:

An improved plant support rack comprising a mating pair of support frames having opposite rectangular peripheral portions, a series of support loops peripherally disposed about each of the pair of support frames and disposed generally perpendicular to the plane of the support frames for supporting the frame equidistantly from the ground, a matrix of wire forming a mesh and mounted from the periphery of the support frame and in the plane aforementioned to form a support surface, there being a series of equally spaced plant-receiving apertures along the mating edges of the pair of support frames, and a plurality of hook fastening means on one of the support frames to engage the other for retaining the pair of support frames in position for supporting the upper portions of plants disposed in said apertures, so that the upper portions of said plants do not come into contact or rest upon the ground and are prevented from being damaged incident to wind or rain weather conditions, said matrix of wire being formed and supported from the opposite recangular peripheral portions of the support frame in forming the support surface thereof.

References Cited
UNITED STATES PATENTS

| | | | |
|---|---|---|---|
| 587,581 | 8/1897 | Horan | 47—47 |
| 871,901 | 11/1907 | Walton | 47—45 X |
| 936,402 | 10/1909 | Beasley | 47—45 |
| 1,453,810 | 5/1923 | Sleen | 47—25 |
| 2,209,891 | 7/1940 | Hoover | 47—32 |

ABRAHAM G. STONE, *Primary Examiner.*

R. CARTER, P. A. RAZZANO, *Assistant Examiners.*